US011577662B2

(12) United States Patent
Podolski

(10) Patent No.: US 11,577,662 B2
(45) Date of Patent: Feb. 14, 2023

(54) DEVICE AND METHOD FOR SECURING A DISPLAY SCREEN ARRANGEMENT FOR A VEHICLE ROOF, AND VEHICLE ROOF FOR A MOTOR VEHICLE

(71) Applicant: Webasto SE, Stockdorf (DE)

(72) Inventor: Thomas Podolski, Stockdorf (DE)

(73) Assignee: Webasto SE, Stockdorf (DE)

( * ) Notice: Subject to any disclaimer, the term of this patent is extended or adjusted under 35 U.S.C. 154(b) by 168 days.

(21) Appl. No.: 17/006,033

(22) Filed: Aug. 28, 2020

(65) Prior Publication Data
US 2021/0070233 A1     Mar. 11, 2021

(30) Foreign Application Priority Data
Sep. 9, 2019    (DE) .......................... 102019124081.6

(51) Int. Cl.
*B60R 11/02*      (2006.01)
*B60R 11/00*      (2006.01)

(52) U.S. Cl.
CPC ... *B60R 11/0229* (2013.01); *B60R 2011/0028* (2013.01); *B60R 2011/0085* (2013.01); *B60R 2011/0092* (2013.01)

(58) Field of Classification Search
None
See application file for complete search history.

(56) References Cited

U.S. PATENT DOCUMENTS

| | | |
|---|---|---|
| 2005/0031317 A1 | 2/2005 | Ikunami |
| 2008/0189908 A1 | 8/2008 | Lowry et al. |
| 2014/0268513 A1* | 9/2014 | Tsen ...................... F16M 11/10 361/679.01 |
| 2020/0183165 A1 | 6/2020 | Hartwig et al. |
| 2021/0162931 A1* | 6/2021 | Bruegl ............... F16M 11/2028 |

FOREIGN PATENT DOCUMENTS

| | | |
|---|---|---|
| DE | 102004036458 A1 | 3/2005 |
| DE | 112006001959 T5 | 6/2008 |
| DE | 102017216525 A1 | 3/2019 |

* cited by examiner

*Primary Examiner* — Christopher Braniff
(74) *Attorney, Agent, or Firm* — Fitch, Even, Tabin & Flannery, LLP

(57) ABSTRACT

A device for securing a display for a vehicle roof having a main slider and an adjustment slider. Each can be coupled to the display and configured for pivoting the display open and closed and for moving it. The device may have a lever arrangement coupled to the main slider and adjustment slider for display open-and closed pivoting and movement. The device also has a locking unit having a locking element coupled to the adjustment slider pivotable relative to the adjustment slider, and which cooperates with a locking pin arranged on the lever arrangement, so that an open position of the locking element in which the locking element is spaced from the locking pin, and a closed position of the locking element in which the locking element retains the locking pin, can be set, and the display can be transferred from a first open-pivoted state into a second closed-pivoted state.

12 Claims, 19 Drawing Sheets

Figure 1:
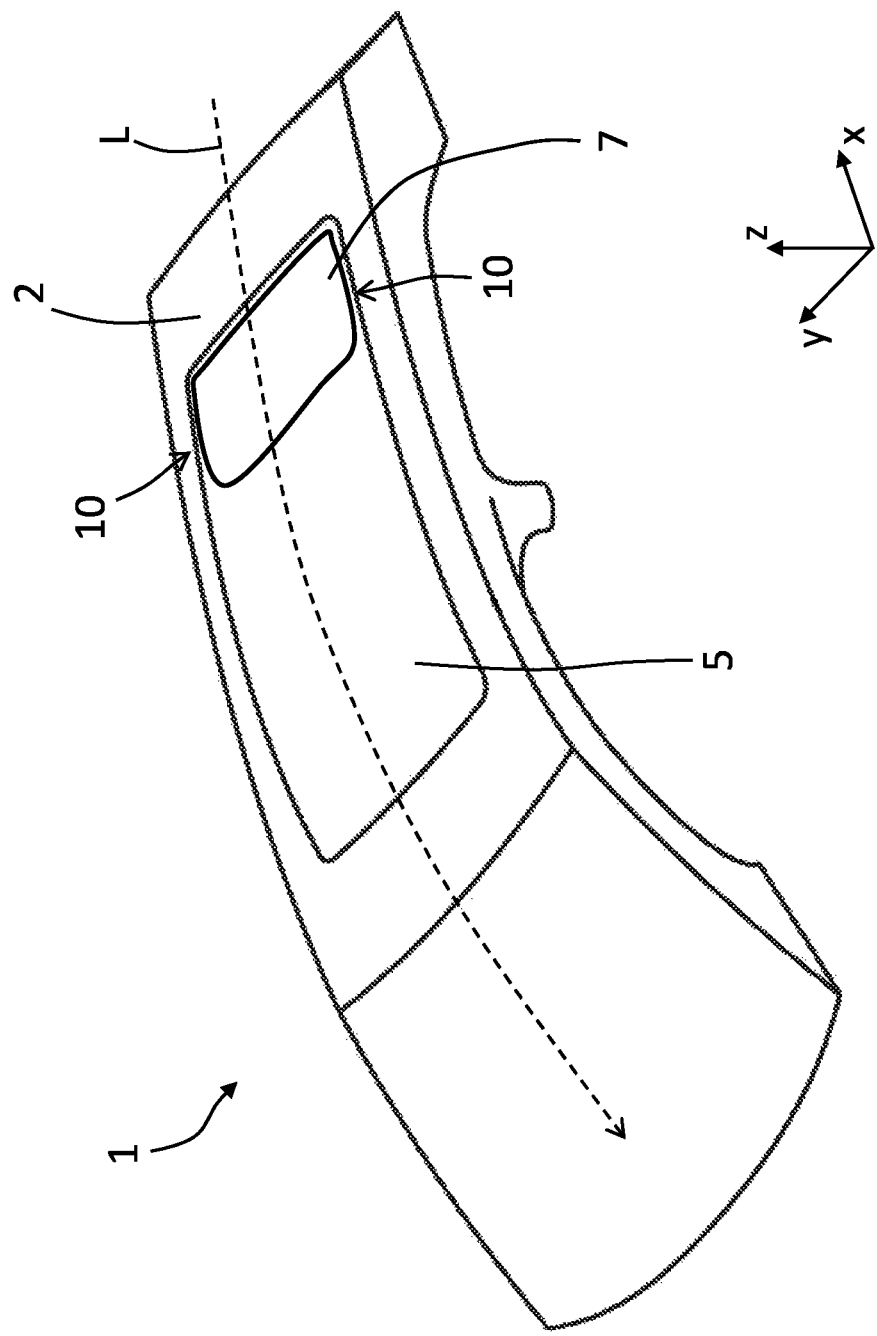

DEVICE AND METHOD FOR SECURING A DISPLAY SCREEN ARRANGEMENT FOR A VEHICLE ROOF, AND VEHICLE ROOF FOR A MOTOR VEHICLE

CROSS-REFERENCE TO RELATED APPLICATIONS

This application claims priority from German Patent Application Number Del. 10 2019 124 081.6, filed Sep. 9, 2019, which is hereby incorporated herein by reference in its entirety for all purposes.

FIELD

The invention concerns a device and method for securing a display screen arrangement for a vehicle roof. The invention furthermore concerns a vehicle roof for a motor vehicle with such a device.

BACKGROUND

Some motor vehicles have a display screen arrangement which can display an entertainment program if desired and contributes to increased comfort of the motor vehicle. In some cases, such a display screen arrangement is provided with a kinematic concept which allows the display screen arrangement to be retracted and deployed as required. The challenge here is to ensure a compact and low-cost arrangement of such entertainment electronics and to form a stable and secure fixing of the arrangement.

SUMMARY

It is an object of the present invention to create a device and a method for securing a display screen arrangement for a vehicle roof, which allows a reliable and secure fixing of the display screen arrangement and can also contribute to an economic and comfortable motor vehicle.

This object is achieved by the features of the respective independent claims. Advantageous embodiments are given in the respective dependent claims.

A device according to the invention for securing a display screen arrangement for a vehicle roof comprises a main slider and an adjustment slider, which can each be coupled to the display screen arrangement and are configured for pivoting the display screen arrangement open and closed and for moving it. The device furthermore comprises a lever arrangement which is coupled to the main slider and to the adjustment slider for open- and closed-pivoting and movement of the display screen arrangement. The device also has a locking unit comprising a locking element, which is coupled to the adjustment slider so as to be pivotable relative thereto and which cooperates with a locking pin arranged on the lever arrangement.

The locking unit and the locking pin are configured such that an open position and a closed position of the locking element can be formed. In the open position, the locking element is spaced from the locking pin. In the closed position, the locking element retains the locking pin and fixes it in its position. Accordingly, the display screen arrangement can be transferred from a first open-pivoted state into a second closed-pivoted state, wherein the open position of the locking element corresponds to an open-pivoted state of the display screen arrangement, and the closed position of the locking element corresponds to a closed-pivoted state of the display screen arrangement.

By means of the device described, a display screen arrangement is achieved which can be set, aligned and secured comfortably and reliably, and which can be produced economically and integrated compactly into the structure of the vehicle roof of a motor vehicle.

In connection with the present invention, it has been found that a reliable and secure fixing is necessary for a motor vehicle with a panoramic display which can be deployed and retracted. By means of the device described, a stable mounting of such a display screen arrangement can be achieved, which allows a reliable and secure fixing of the display screen arrangement in a corresponding parked position and counters any vibrations of the parked display screen arrangement. Also, the device contributes to a safe vehicle interior and an attractive design, because the locking element is configured so as to be rotatable or pivotable.

In particular, the locking unit may be configured such that the locking element is not visible from a vehicle interior, and is arranged concealed for example inside a cover mechanism, inside a guide rail or behind a cover. Thus no fixed hooks are required on a slider or on a roof spar of a vehicle roof, which would be visible to vehicle passengers from the vehicle interior and could be misused, for example for hanging clothing or an object, and would also constitute a risk of injury.

According to a preferred embodiment, the locking unit furthermore comprises a guide element which is coupled to the locking element and configured to cause a pivot movement of the locking element in order to form the closed position of the locking element. The guide element and the locking element may for example be arranged on opposite ends of a shaft or bolt, and be configured so as to be rotatable about a common rotation axis.

According to a further preferred embodiment, the locking unit comprises a stop element which cooperates with the guide element so that, in the open position of the locking element, the guide element is spaced from the stop element, and contacts the stop element when the closed position of the locking element is formed. The guide element forms for example a guide peg which comes into contact with the stop element beyond a certain position. On further driving of the adjustment slider and/or main slider, the guide peg and stop element are forced towards each other so that a wall of the stop element causes a twist or rotation of the guide peg and hence a twist or rotation of the locking element. The stop element is preferably formed as a stationary component on or in a guide rail or a sliding block guide, and for example is L-shaped or U-shaped so as to allow reliable and low-resistance rotation of the guide peg.

According to an embodiment of the locking unit, the guide element cooperates with a sliding block guide which predefines a guided movement of the guide element for setting the open position and the closed position of the locking element.

According to an embodiment, the locking unit furthermore comprises a spring element which is coupled to the locking element and configured to exert a spring force on the locking element that drives the locking element into the open position. The spring element offers a simple and economic way of setting the open position of the locking element. The spring element is for example arranged around a shaft that connects the locking element and the guide element together. Such a spring element should be provided in particular if, for example, no sliding block guide is provided for forming the open position of the locking element. Alternatively, the open position of the locking element may be set by a sliding block guide, so no spring element is required.

According to an embodiment, the locking unit comprises a frame-like spacer which is coupled on one side to a pivot lever of the lever arrangement and on the other side to the adjustment slider, and inside which the locking element is arranged. The locking element may for example be arranged, together with the spring element and guide element, compactly in the free space inside the frame-like spacer. The spacer is provided in particular to ensure the necessary spacing between a display screen kinematic and the display screen arrangement which is required to allow reliable retraction and deployment of a display. The spacer may for example form part of the adjustment slider, so that by means of the device described and the locking unit, a free space which is present in any case is utilised efficiently and no or only a slight geometric enlargement of the device structure is required.

In particular, the locking element is formed as a hook, and for example engages as a finger below the locking pin when the display screen arrangement is in the parked position. The parked position corresponds to the closed-pivoted second state of the display screen arrangement, in which the screen is retracted substantially horizontally relative to a main extension plane and parallel to the vehicle roof. In the deployed first state, the display screen arrangement is then for example oriented vertically and extends downward into the vehicle interior. In the context of the present description, terms such as "top", "bottom", "vertical" and "horizontal" refer to directions or orientations corresponding to a serviceable motor vehicle.

According to a further embodiment of the device, the locking unit comprises a pivot lever on which the locking element is formed and which has a slot. Furthermore, a coupling pin is arranged on a pivot lever of the lever arrangement, and engages in the slot so as to set a relative movement of the locking element and of the locking pin, which is guided by means of the coupling pin and the slot. The pivot lever of the locking unit is for example formed as a punched plate with the slot, and is coupled to the coupling pin of the pivot lever of the lever arrangement. This allows the open position and closed position of the locking element to be formed by pivoting or sliding.

According to a further embodiment of the device, the lever arrangement comprises a main control arm and a pivot lever which are coupled together so as to be pivotable relative to each other. The main control arm is provided for coupling or attachment and fixing of the display screen arrangement, and the pivot lever is designed to couple the main control arm to the adjustment slider. The locking pin is formed for example on an end of the main control arm which faces away from the adjustment slider with respect to a first open-pivoted state of the display screen arrangement.

Furthermore, the device preferably comprises a first drive unit and a second drive unit. The first drive unit is coupled to the main slider by means of a first drive cable, and the second drive unit is coupled to the adjustment slider by means of a second drive cable. Preferably, the first and/or the second drive unit comprises an electric motor. By means of the device described, an electrically actuated mechanism can be provided for pivoting, moving and securing a display screen arrangement, which allows comfortable lowering, alignment and adjustment, and stowing or parking of a display in a vehicle interior.

The locking element of the device is preferably formed as a rotatable hook in or on the adjustment slider, and arranged for example on a mounting of the lever arrangement for the display or screen arrangement. The locking element locks the display screen arrangement in the parked position, or alternatively locks the pivot lever of the lever arrangement which couples the adjustment slider to the display screen arrangement. In particular, the locking element locks by a rotational movement only in the parked position of the display screen arrangement, and secures this in its retracted position. Locking takes place in particular because of a contact of the guide element with the stop element, or a guided movement inside a sliding block guide in a guide rail. The locking hook or locking element is concealed for example in the cladding of the adjustment slider when the display is deployed, and hence is invisible to a vehicle passenger.

Alternatively or additionally, locking may take place by means of a rotatable or sliding hook on a pivot lever which cooperates with the lever arrangement coupling the adjustment slider to the display screen arrangement. In the parked position, the locking element locks the display or alternatively the main control arm or pivot lever of the lever arrangement or the adjustment slider. The locking element locks only in the parked position, for example by kinematic pivoting via an actuation shaft which is actuated by contact with a stop or because of a sliding block guidance in a guide rail. When the display is deployed, the locking element remains concealed and is for example arranged in a cladding of the lever arrangement and hence is invisible to vehicle passengers from the vehicle interior.

The device described for securing a display screen arrangement for a motor vehicle thus provides beneficial effects: a locking hook is not visible from the vehicle interior. Thus the hook cannot be misused by passengers of an associated motor vehicle. It is not necessary to adapt the vehicle headlining geometry. Also, the device can be configured and arranged by making a compact slot in a headlining which holds the kinematics for a panoramic display screen arrangement. Thus a compact and stable construction and attractive design of the device can be achieved at low cost.

A vehicle roof according to the invention comprises two guide rails which are arranged on opposite sides of the vehicle roof with respect to a longitudinal axis of the vehicle roof. The vehicle roof furthermore comprises an embodiment of the device described above for securing a display screen arrangement, which is coupled to the vehicle roof by means of the guide rails. The device may in particular use existing spaces inside a respective guide rail, which are formed for example for operating a shading device.

With respect to a vehicle roof, the device may in particular comprise twice the number of components described, which are configured and arranged substantially mirror-symmetrically with respect to a central or middle longitudinal axis of the vehicle roof. The vehicle roof with the device described thus allows secure stowage and fixing of the display screen arrangement in a retracted parked position, and contributes to an increased comfort of the motor vehicle. Because the vehicle roof comprises an embodiment of the device described above, the features and properties of the device described above are also disclosed for the vehicle roof.

A method according to the invention for securing a display screen arrangement for a vehicle roof comprises driving a main slider and/or an adjustment slider, which are pivotably coupled to the display screen arrangement by means of a lever arrangement, and thereby pivoting the display screen arrangement in order to transfer the display screen arrangement from a first open-pivoted state into a second closed-pivoted state. The method furthermore comprises locking the display screen arrangement in the second, retracted state by pivoting of a locking element of a locking unit, which element is coupled to the adjustment slider so as to be pivotable relative thereto. The locking element here cooperates with a locking pin arranged on the lever arrangement, so that an open position of the locking element in which the locking element is spaced from the locking pin, and a closed position of the locking element in which the locking element retains the locking pin, can be set. Thus a secure second state of the display screen arrangement can be formed.

By means of the method described, it is possible to form a reliable and secure parked position of the display screen arrangement. The method may be implemented in particular by means of an embodiment of the device described above, so that the features and properties of the device described are also disclosed for the method and vice versa.

BRIEF DESCRIPTIONS OF THE DRAWINGS

Figure 2:
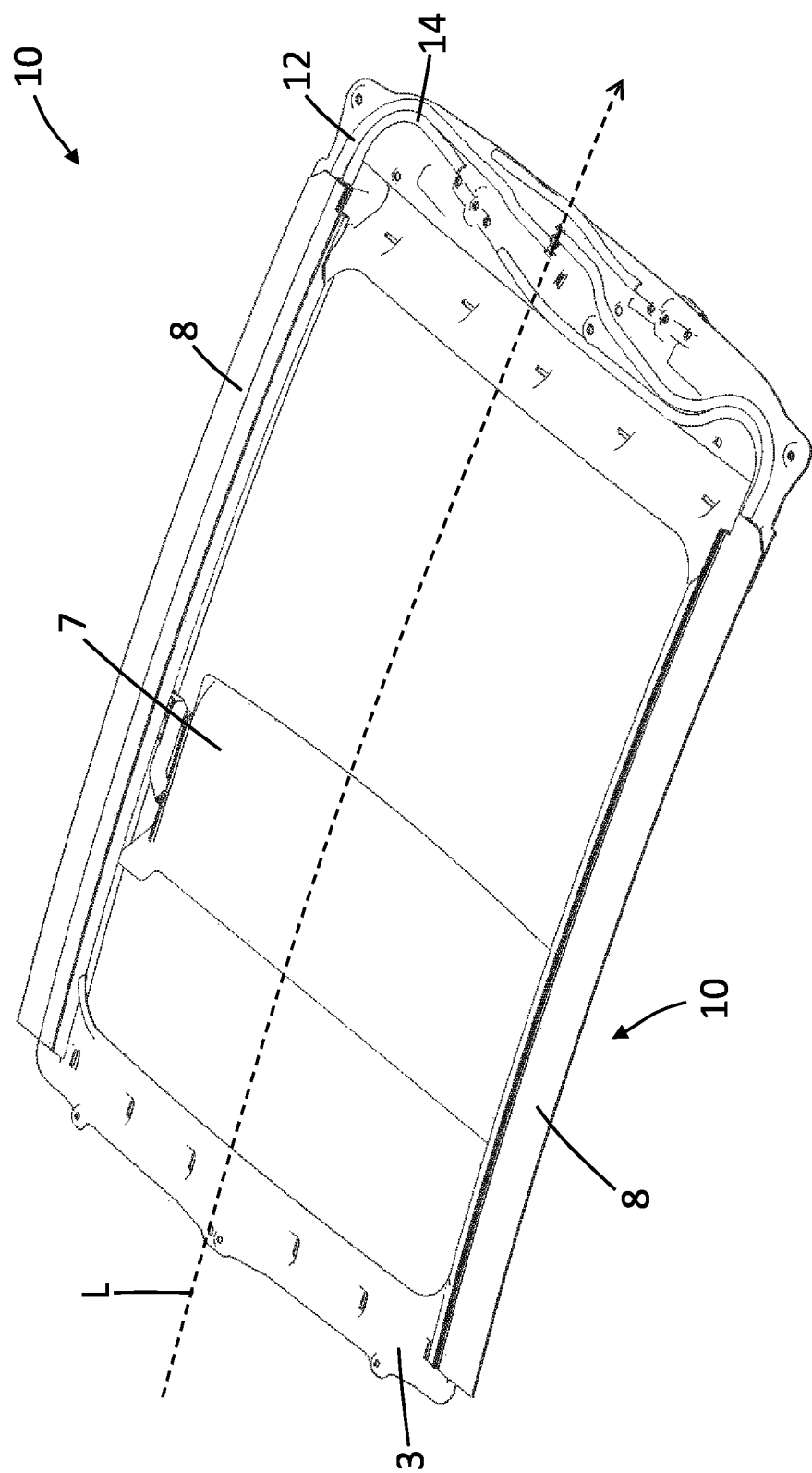
Figure 18:
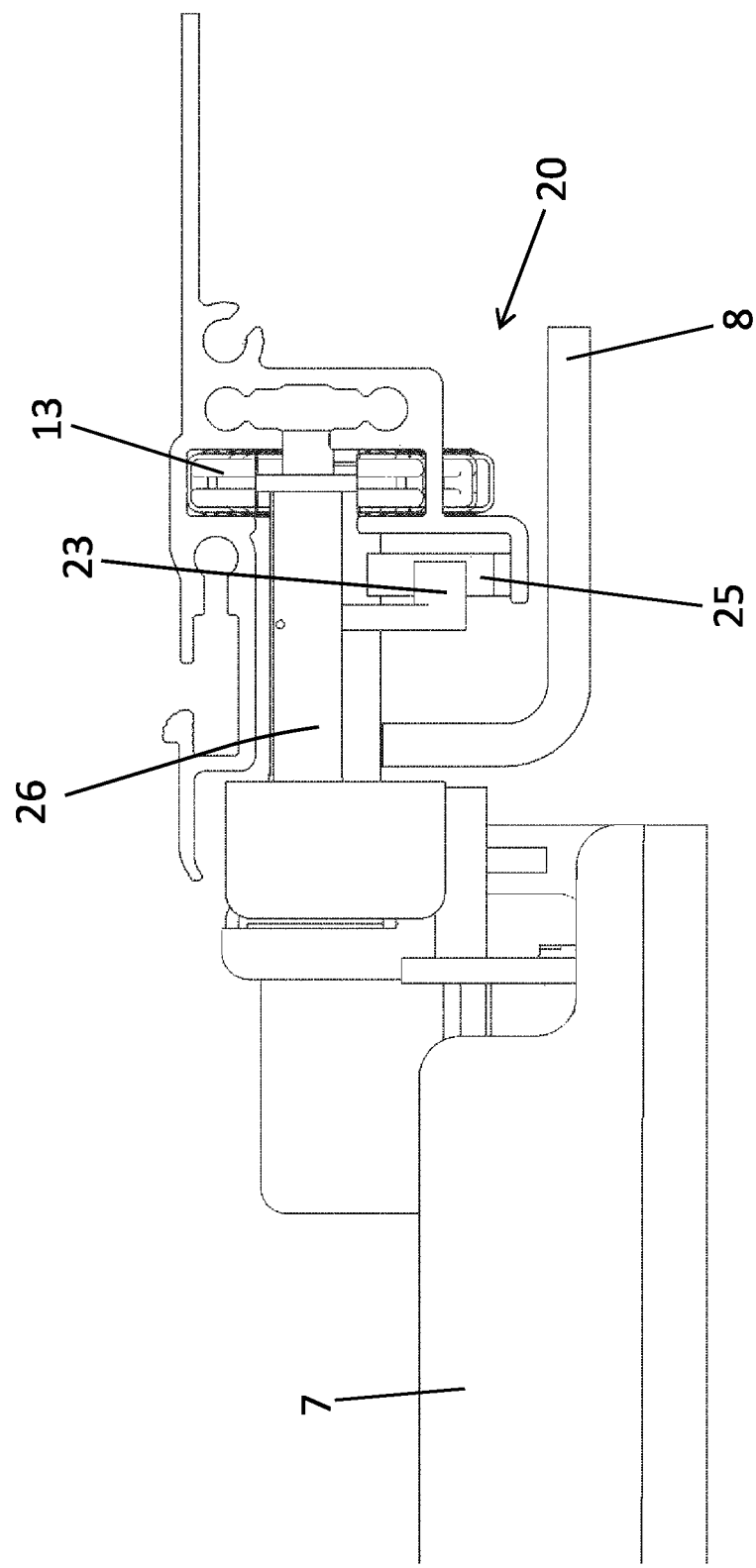
Figure 19:
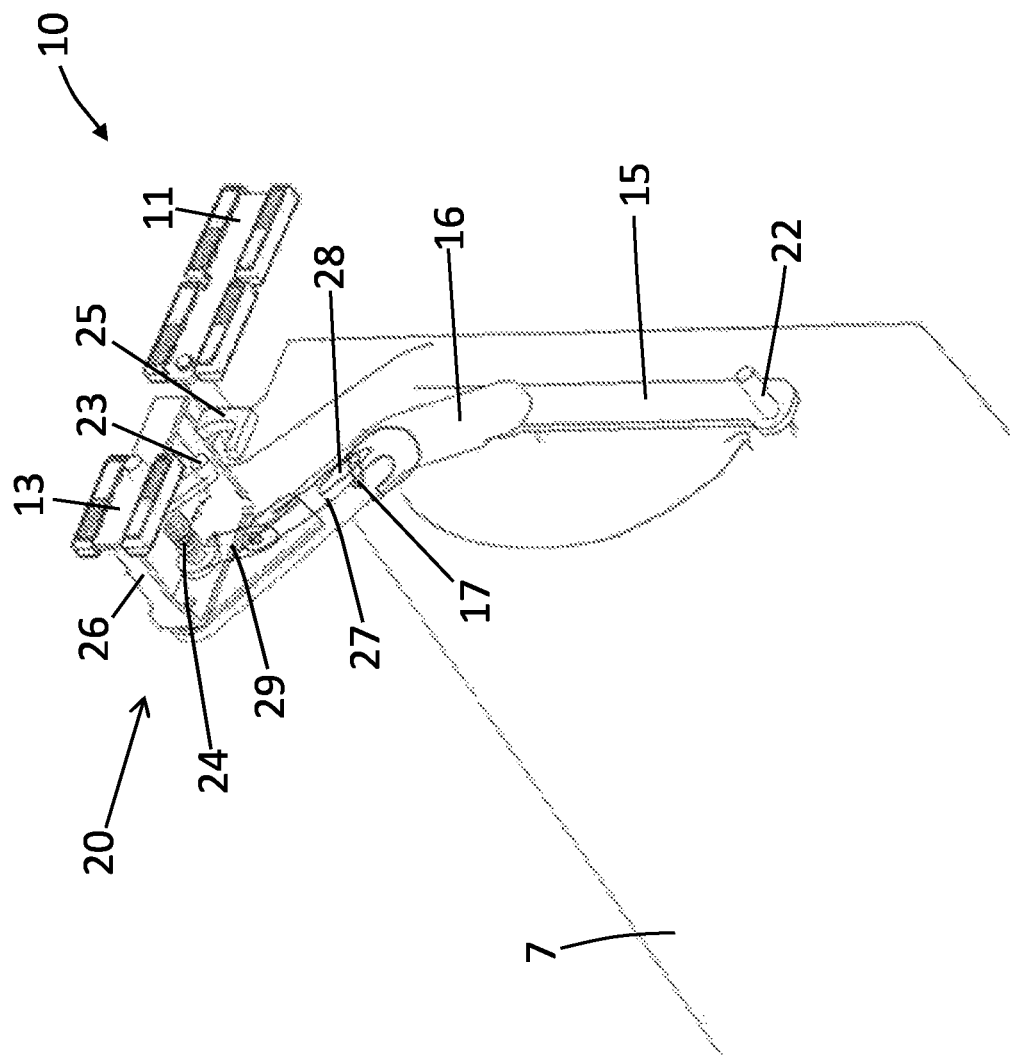

Exemplary embodiments of the invention are explained below with reference to the diagrammatic drawings. The drawings show:

FIG. 1 a motor vehicle with a vehicle roof in a perspective view,

FIG. 2 a display screen arrangement for a vehicle roof in a perspective view,

FIGS. 3-18 an exemplary embodiment of a device for securing the display screen arrangement for the vehicle roof, and FIG. 19 a further exemplary embodiment of a device for securing the display screen arrangement for the vehicle roof.

DETAILED DESCRIPTION

Elements of the same design or function carry the same reference signs across all figures. For reasons of clarity, in some cases not all elements depicted are marked with reference signs in all figures.

FIG. 1 shows diagrammatically, in a perspective view, a vehicle roof 2 of a motor vehicle 1 which has a cover 5 and a display screen arrangement 7. The cover 5 is for example a fixed glass element which is immovable relative to the vehicle roof 2. Alternatively, the cover 5 is movable relative to the vehicle roof 2 in order optionally to open and close an orifice in the vehicle roof 2. The vehicle roof 2 may also have no cover 5 and be a roof without orifice, for example a folding or collapsible cabriolet roof which can be stowed in a rear region of the motor vehicle 1. In addition, the vehicle roof 2 with a cover 5 may form a cabriolet roof, wherein the cover 5 is configured so as to allow folding or collapse. As explained with reference to the following FIGS. 2 to 19, a device 10 allows comfortable orientation and reliable fixing of the display screen arrangement 7. FIGS. 2 to 18 each show diagrammatically an exemplary embodiment of the device 10 for securing the display screen arrangement 7 in a closed-pivoted or retracted state. Such a state is illustrated for example in FIG. 2, which shows a perspective or isometric view of the display screen arrangement 7. The display screen arrangement 7 in particular constitutes a panoramic display which may be deployed as entertainment electronics when required. The display screen arrangement 7 is coupled to an adjustment slider 13 and a main slider 11 by means of a lever arrangement, wherein said sliders are arranged so as to be moveable inside a slide channel of a guide rail 8.

Two guide rails 8 are arranged on opposite sides with respect to a longitudinal axis L of the vehicle roof 2. The structure shown is in particular mirror-symmetrical with respect to the longitudinal axis L of the vehicle roof 2, so that a device 10 is arranged on each of the opposite sides of the vehicle roof 2. Therefore in each case, a main slider 11 and an adjustment slider 13 are mounted in a respective guide rail 8 so as to be driveable by means of a first drive cable 12 and a second drive cable 14 respectively. The guide rails 8 are coupled to a roof frame 3 of the vehicle roof 2, which allows connection to a body of the motor vehicle 1. The main slider 11 and the adjustment slider 13 are driven electrically so as to pivot the display screen arrangement 7 open and closed, and move it along the longitudinal axis L of the vehicle roof 2.

Figure 3:
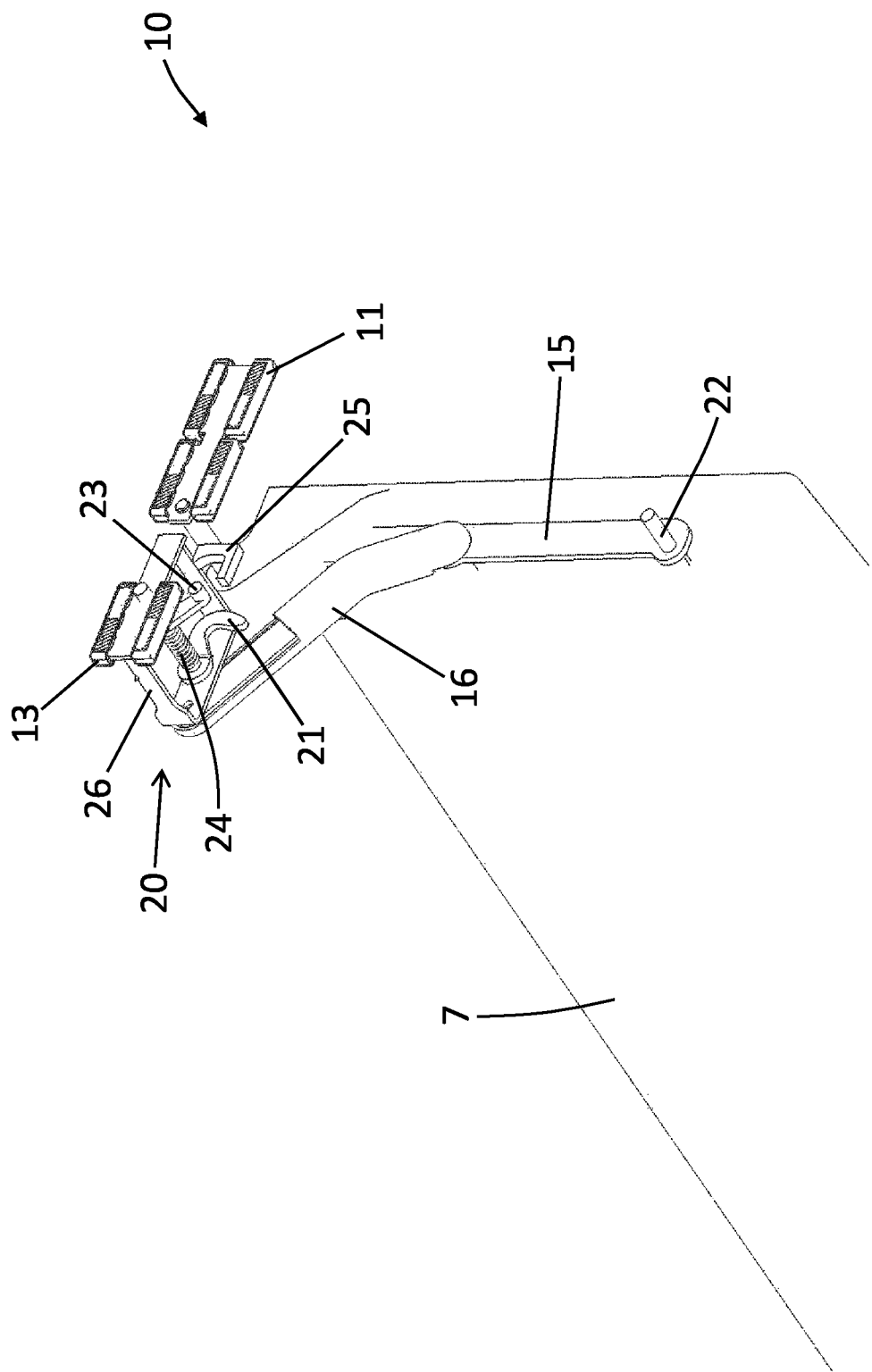

FIG. 3 shows a perspective, detail view of the device 10. This is configured to hold and secure the display screen arrangement 7 and, as well as the main slider 11 and adjustment slider 13, comprises a lever arrangement 15, 16 which is coupled to the main slider 11 and adjustment slider 13 respectively for open- and closed-pivoting and movement of the display screen arrangement 7. The device 10 also has a locking unit 20 comprising a locking element in the form of a locking hook 21. The locking hook 21 is coupled to the adjustment slider 13 so as to be pivotable relative thereto. The locking hook 21 is connected to a guide element 23 by means of a shaft and arranged so as to be rotatable inside a free space of a frame-like spacer 26. The spacer 26 is in turn pivotably coupled to a pivot lever 16 of the lever arrangement. The pivot lever 16 of the lever arrangement is furthermore pivotably coupled to a main control arm 15 of the lever arrangement, which allows the display screen arrangement 7 to be fixed. A locking pin 22 is arranged on the main control arm 15 and cooperates with the locking hook 21.

The locking hook 21 cooperates with the locking pin 22 such that an open position of the locking hook 21, in which the locking hook 21 is spaced from the locking pin 22, and a closed position of the locking hook 21, in which the locking hook 21 retains locking pin 22, can be set. FIG. 3 therefore shows an open position of the locking unit 20 or locking hook 21, which corresponds to a first open-pivoted state of the display screen arrangement 7. Accordingly, the closed position of the locking unit 20 or locking hook 21 corresponds to a second closed-pivoted state of the display screen arrangement 7.

Figure 4:
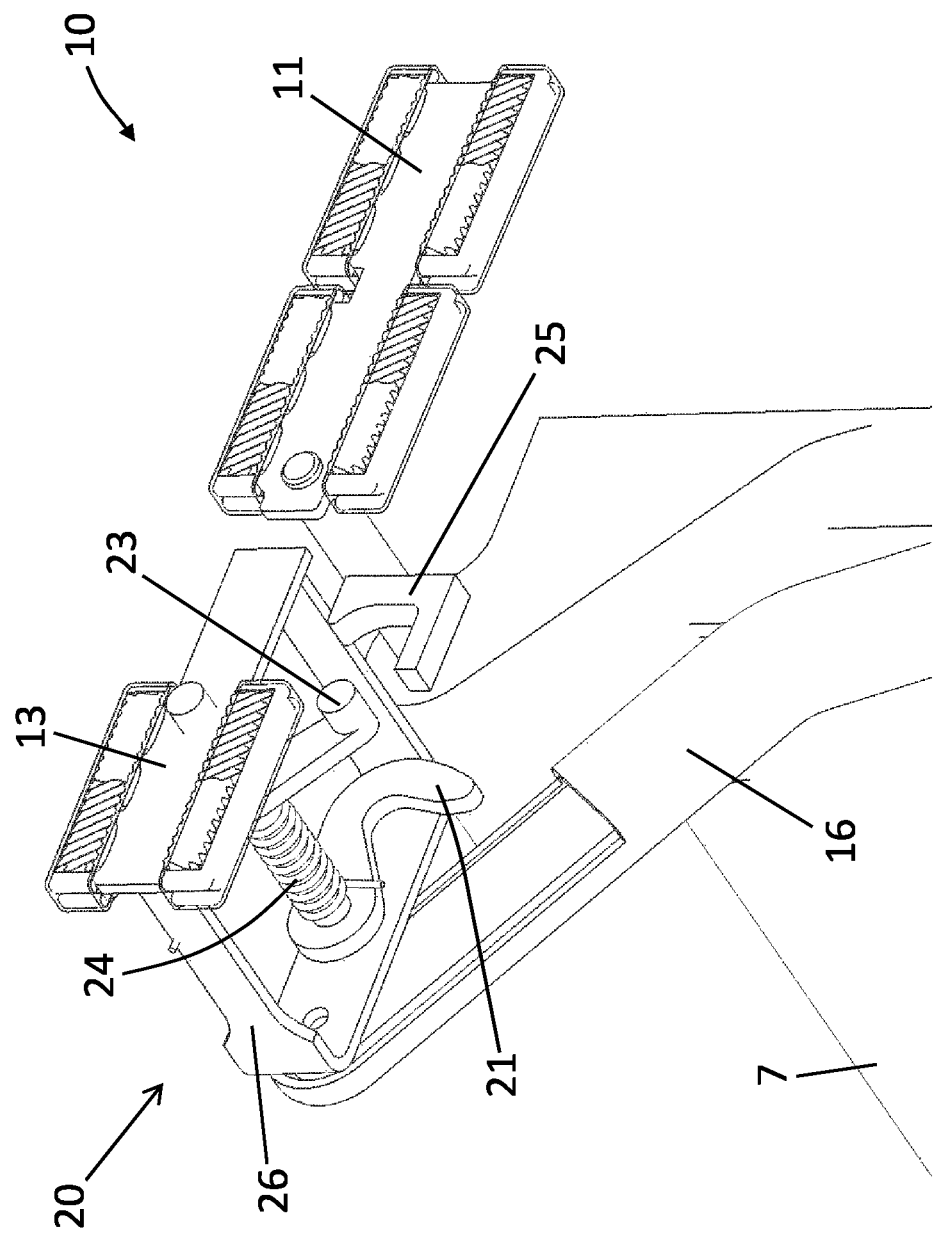
Figure 5:
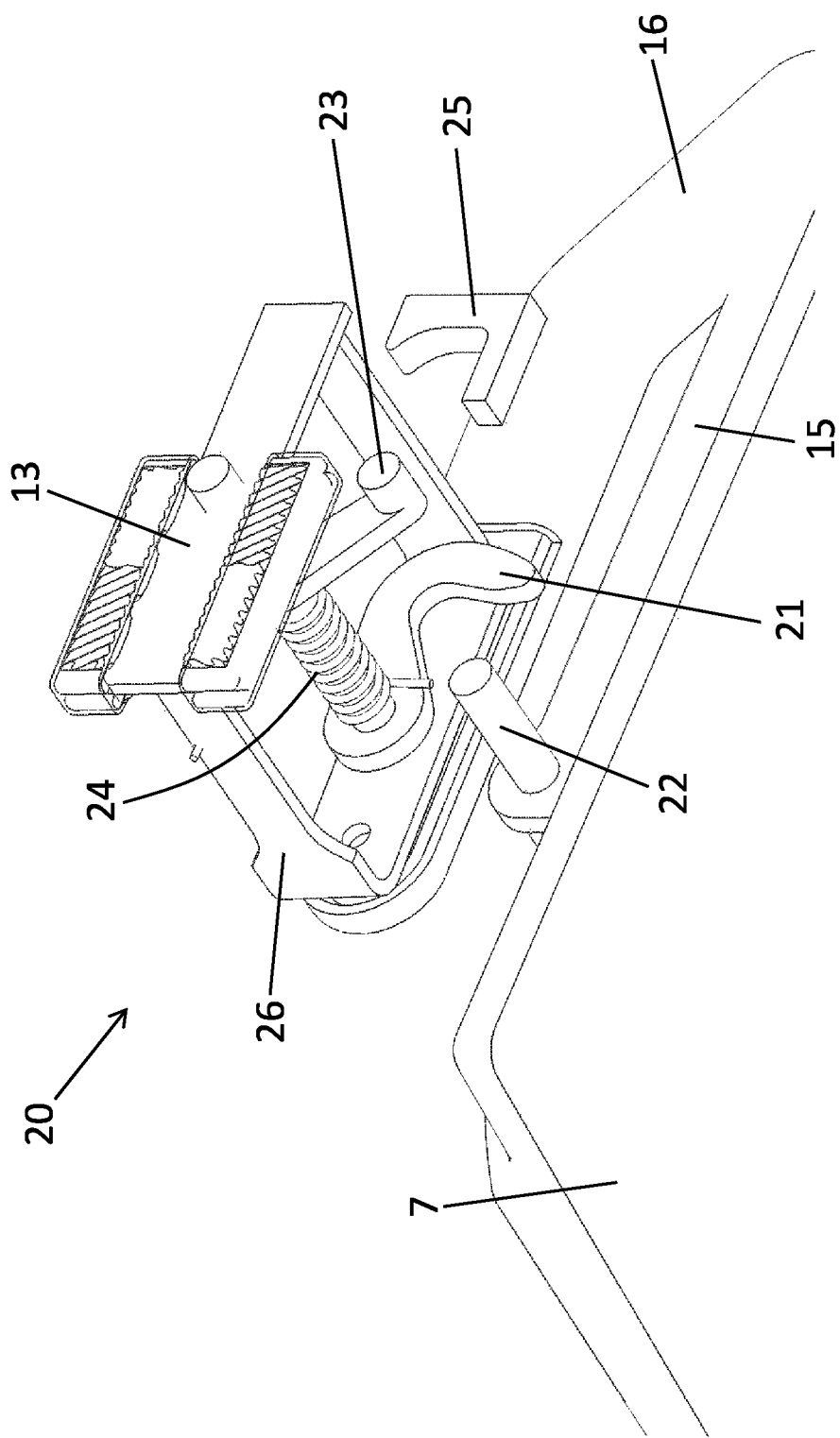
Figure 6:
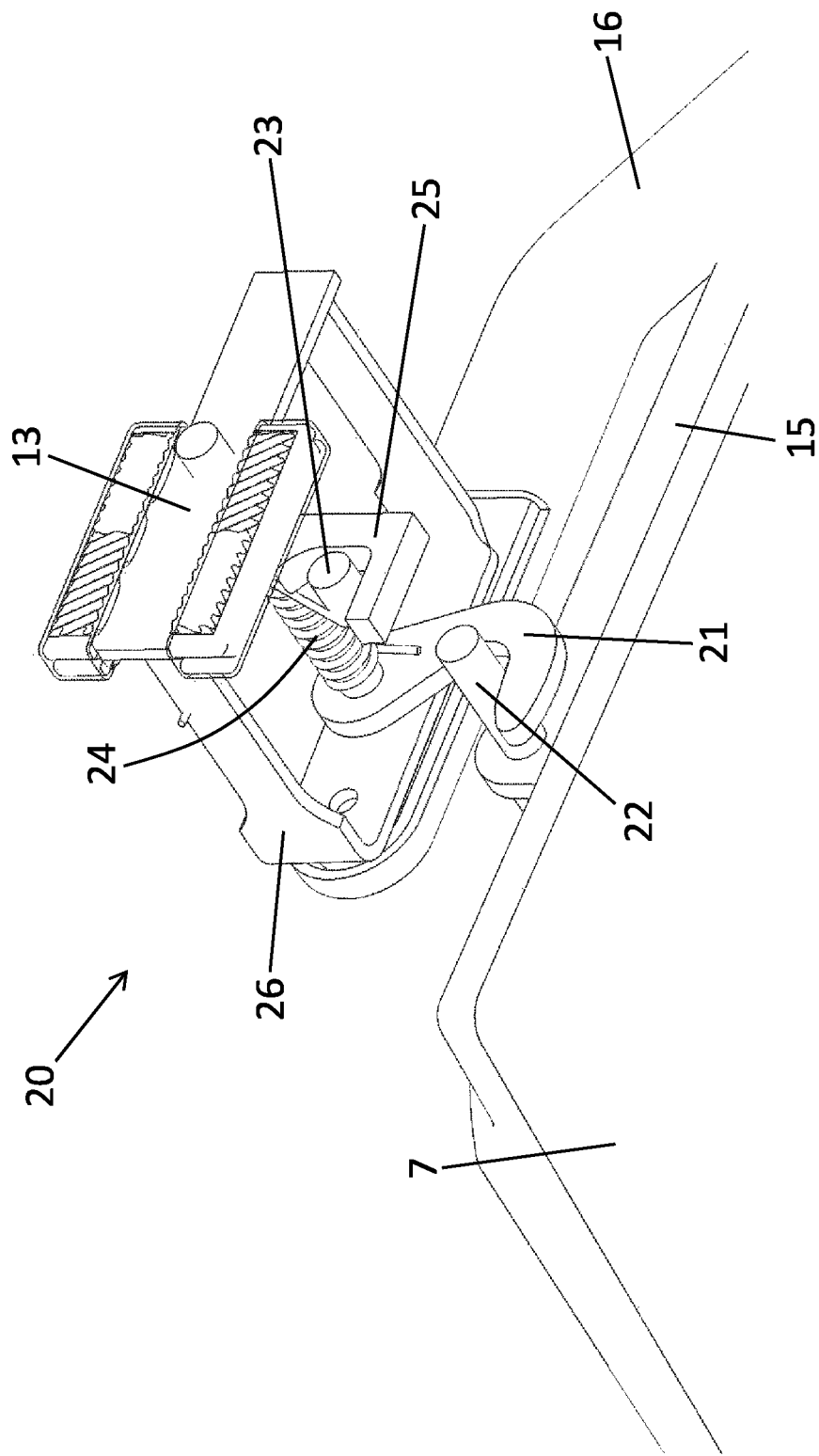

FIGS. 4 and 5 each show an enlarged detail view of the locking unit 20. The locking unit 20 furthermore comprises a spring element 24 which surrounds the shaft between the locking hook 21 and the guide element 23, and exerts a spring force on the locking hook 21 in the direction of the open position. Also, the locking unit 20 has a stop element 25 which cooperates with the guide element 23.

The stop element 25 is formed L-shaped or U-shaped, and arranged for example stationarily on the guide rail 8 or on a sliding block guide. In the open position of the locking hook 21, the stop element 20 is spaced from the guide element 23. When forming the closed position of the locking hook 21, the guide element 23 is moved towards the stop element 25 until the two elements 23 and 25 make contact with each other. On further driving of the adjustment slider 13 and/or main slider 11, a driving force is exerted on the guide element 23 in the direction of the stop element 25 or in the direction of the longitudinal axis L, and causes a rotation of the guide element 23.

Insofar as the driving force is greater than the spring force of the spring element 24, the rotating guide element 23 transmits its rotation to the locking hook 21 so that this engages below the locking pin 22 and retains this. Thus the locking hook 21 fixes the main control arm 15 and the display screen arrangement 7 attached thereto (see FIG. 6).

Figure 7:
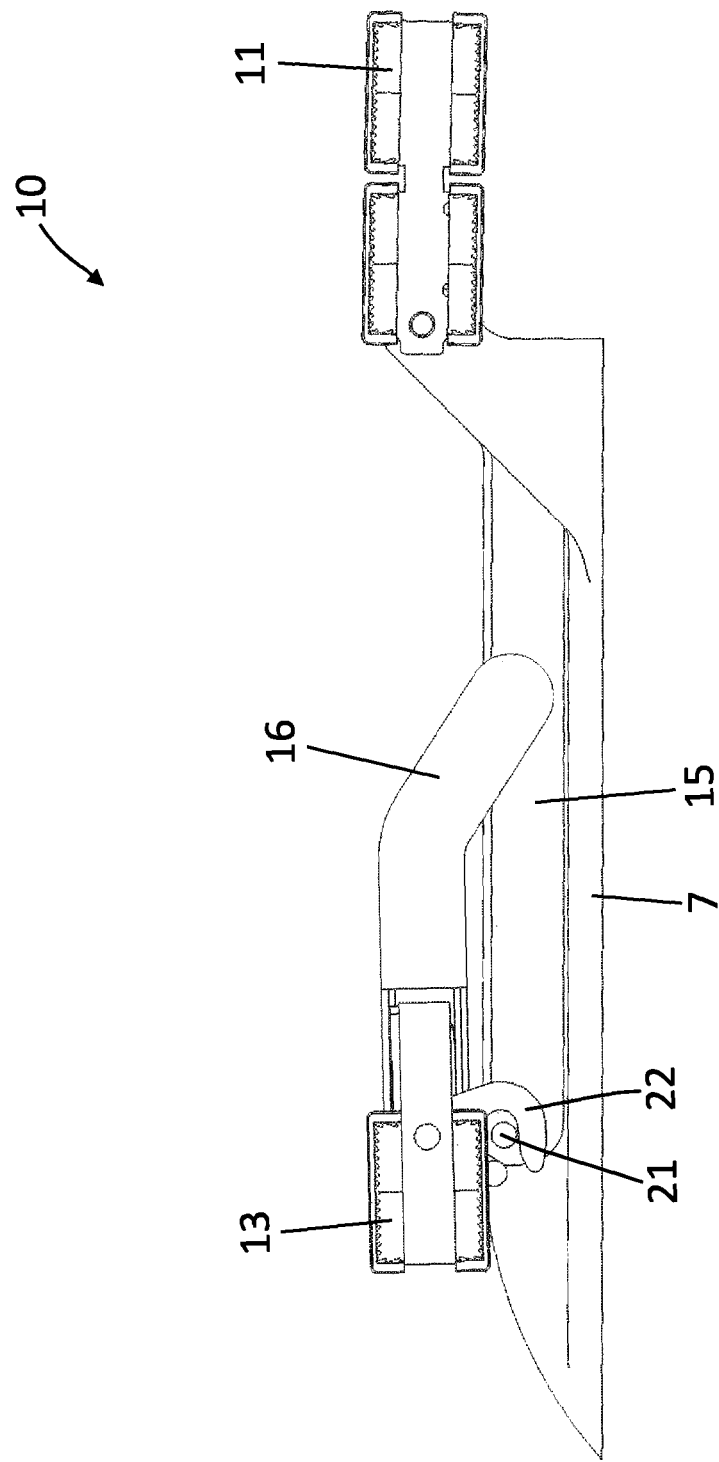
Figure 8:
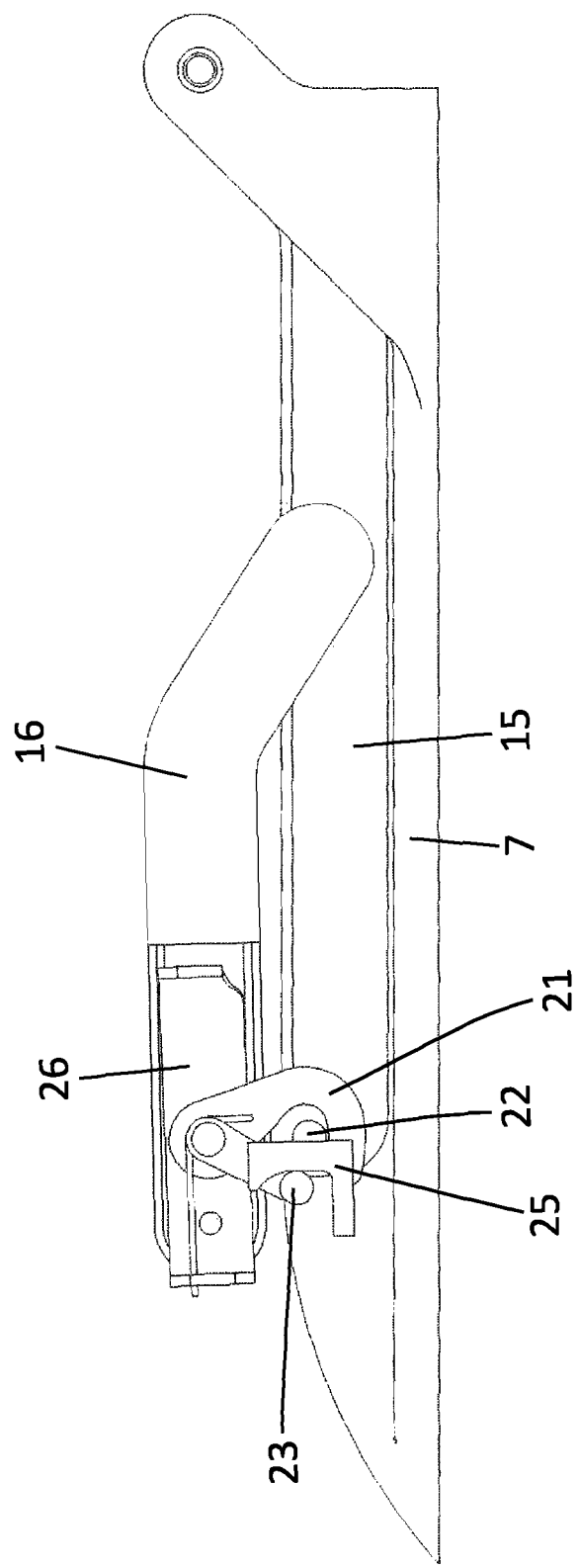
Figure 9:
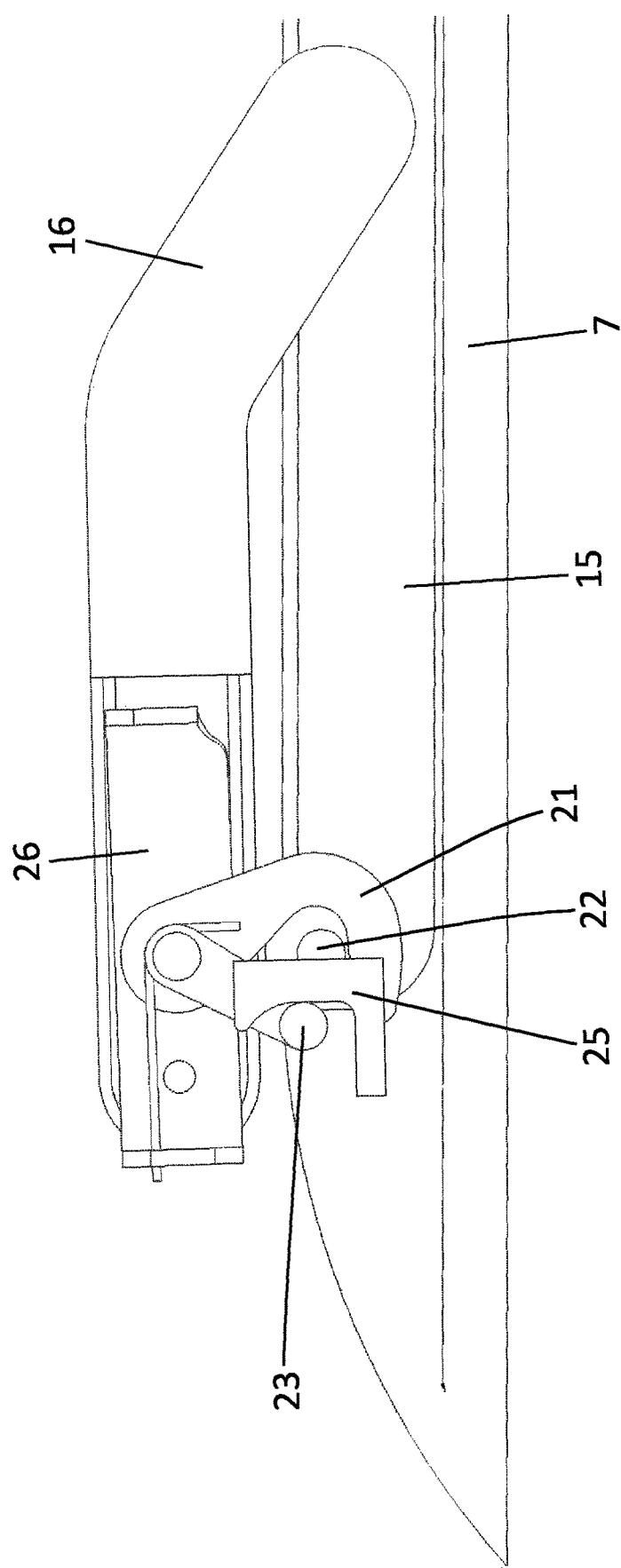

FIG. 7 shows a side view of the device 10 in which the display screen arrangement 7 is pivoted closed or retracted, and is in its parked position. Accordingly, the locking unit 20 or locking hook 21 is in the closed position and secures the retracted display screen arrangement 7. FIGS. 8 and 9 show enlarged detail views of the side view illustrated in FIG. 7, in which components have been omitted for greater clarity.

Figure 10:
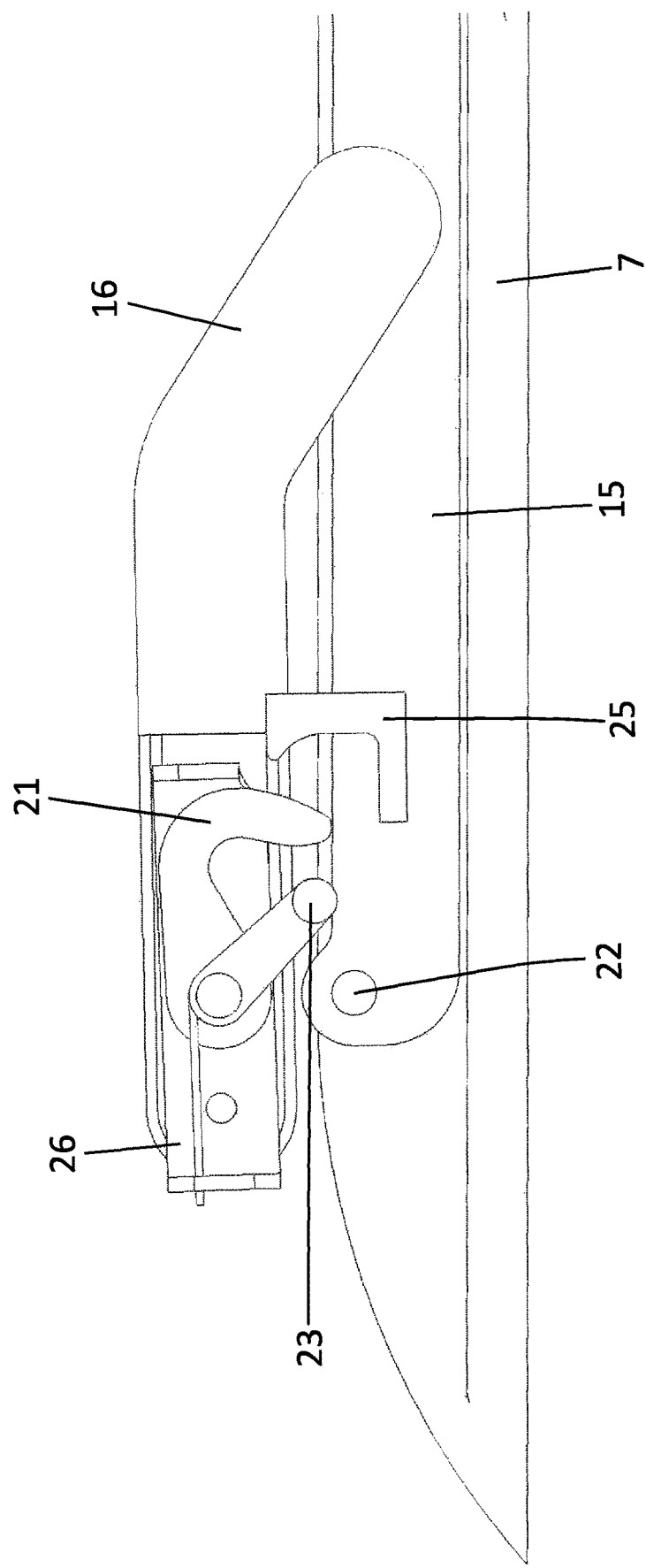
Figure 11:
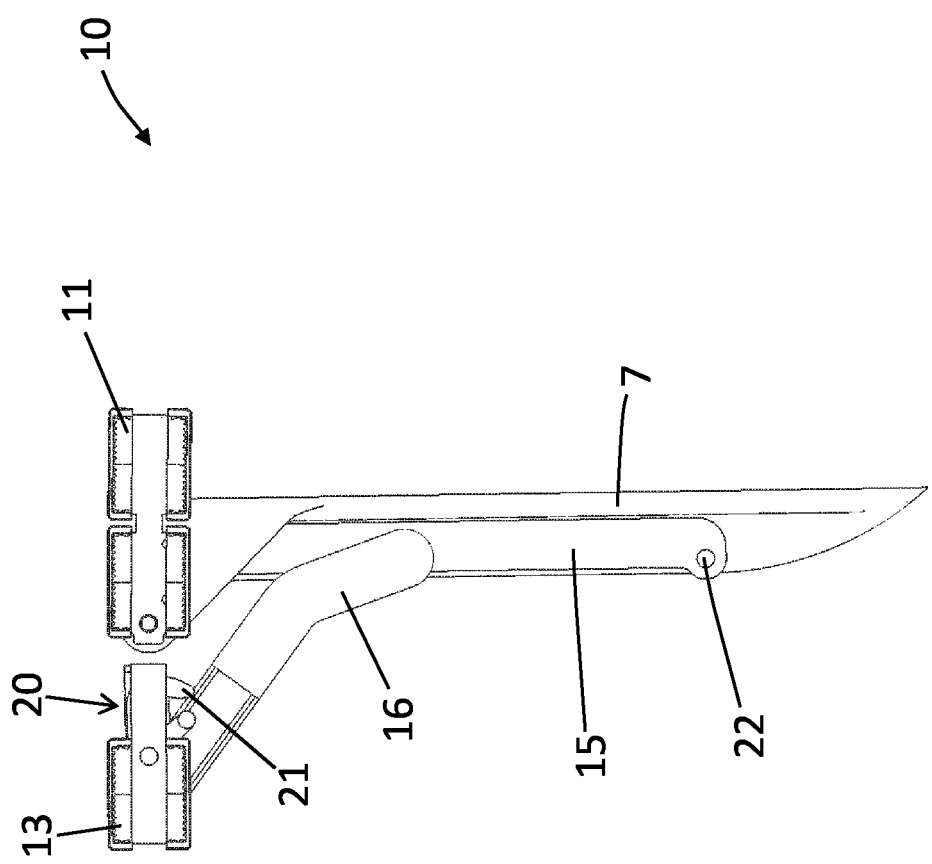
Figure 12:
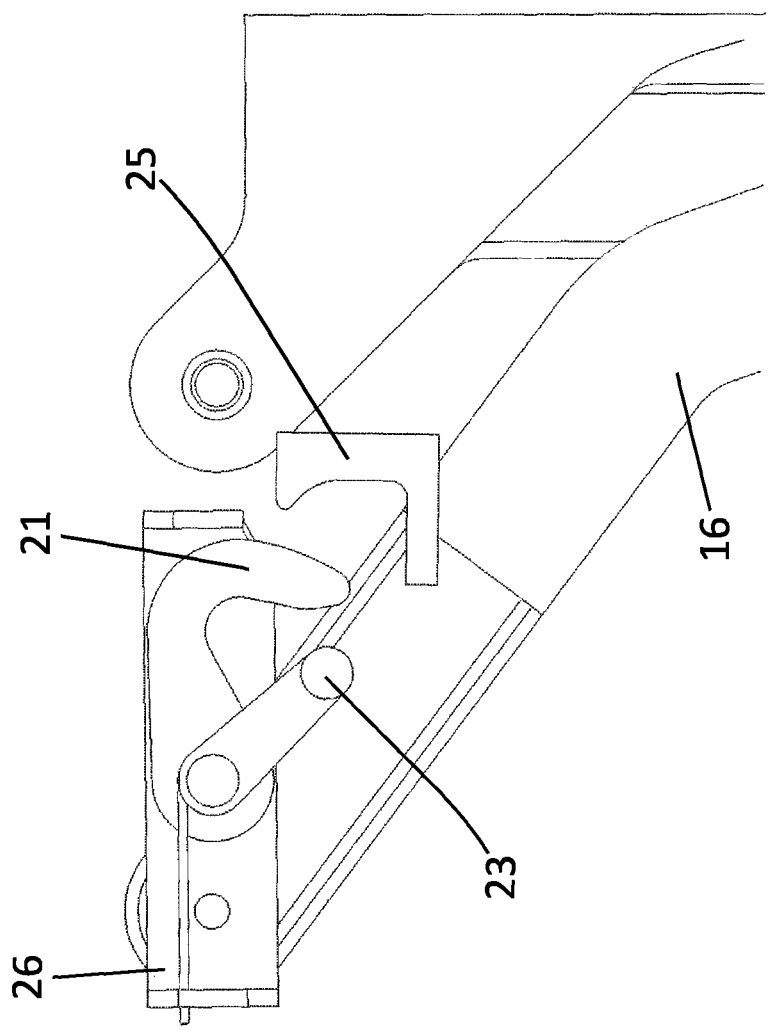
Figure 13:
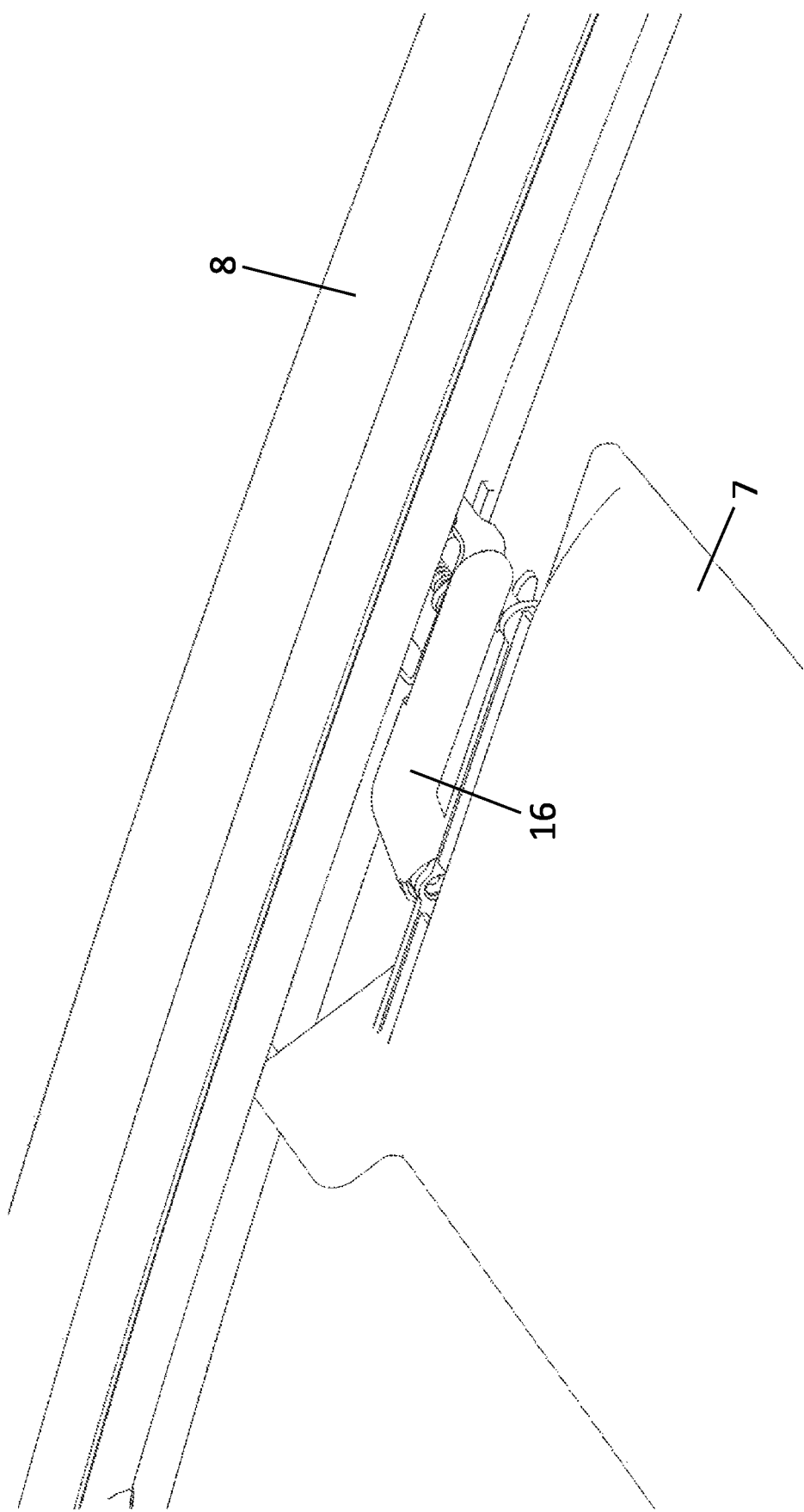
Figure 14:
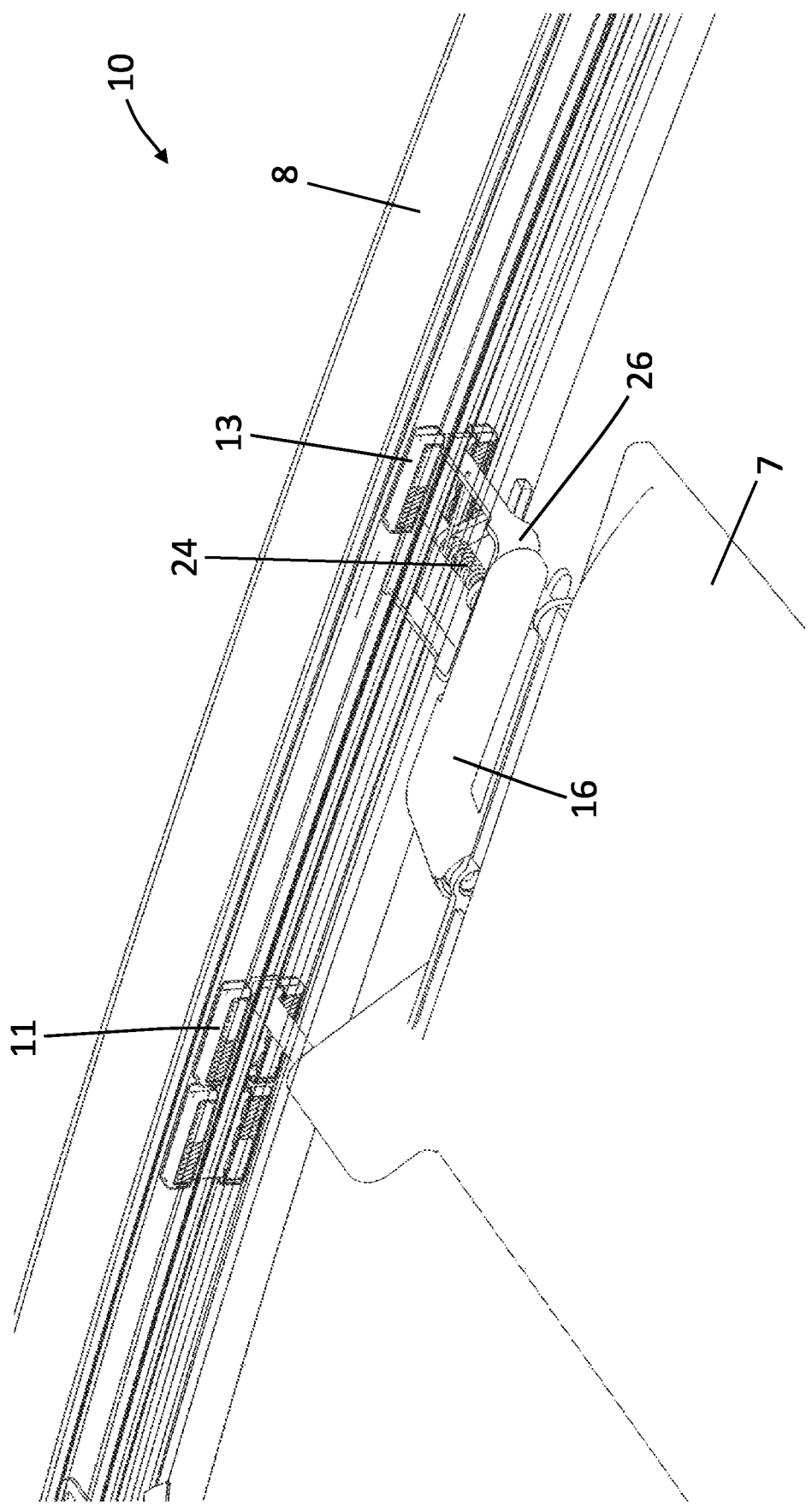
Figure 15:
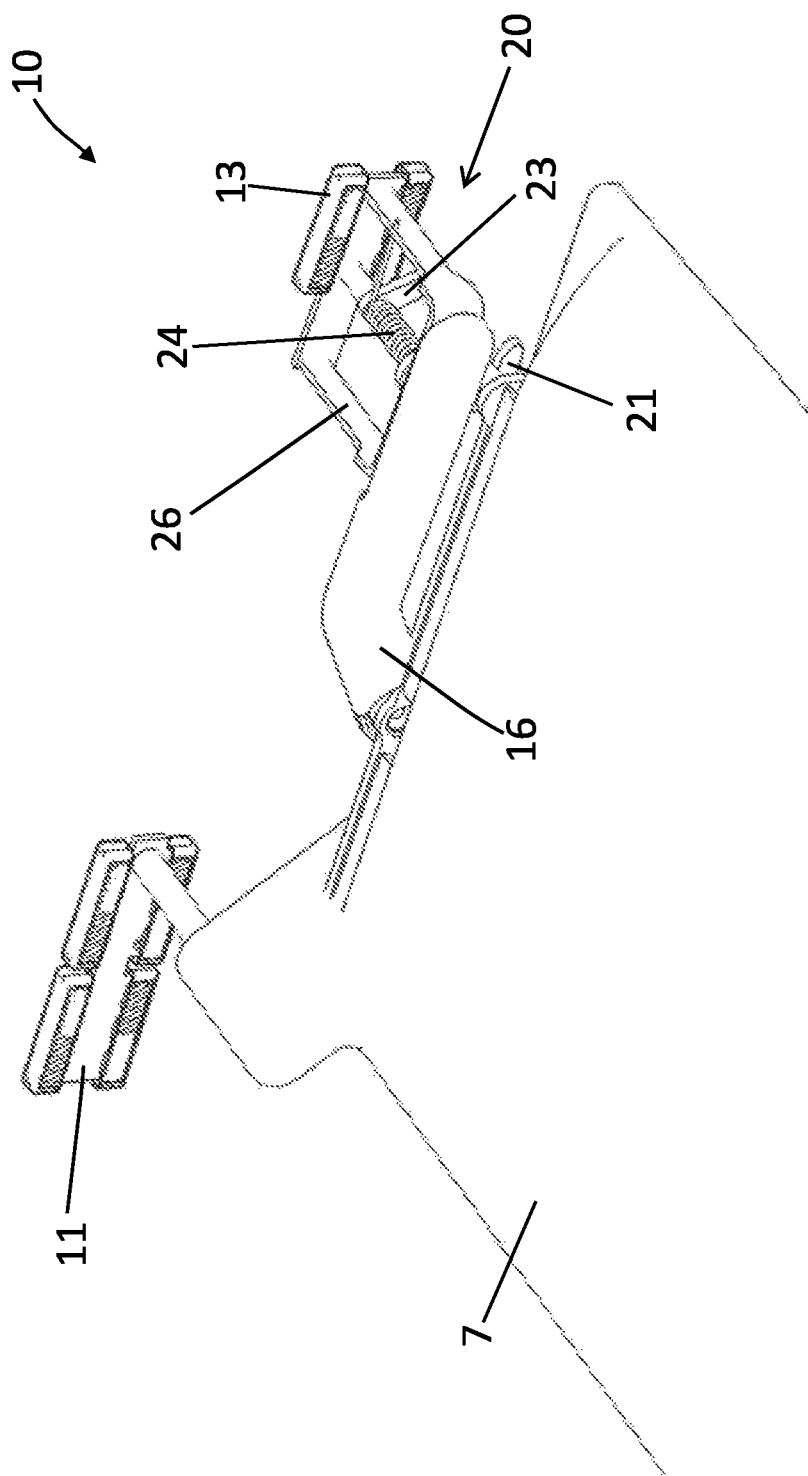

FIG. 10 illustrates a side view in which the closed position of the locking hook 21 is eliminated, and an open position of the locking hook 21 is formed by movement of the adjustment slider 13 and/or main slider 11. Then the display screen arrangement 7 can be deployed or pivoted open. FIGS. 11 and 12 show the device 10 or components of the device 10 in the deployed state of the display screen arrangement 7.

FIGS. 11 to 15 show the device 10 and the display screen arrangement 7 in further perspective or isometric views, wherein the display screen arrangement 7 is in the closed-pivoted or parked position, and the locking hook 21 in the closed position secures the display screen arrangement 7. For illustration, the guide rail 6 is shown transparently in FIG. 14 and omitted in FIG. 15.

Figure 16:
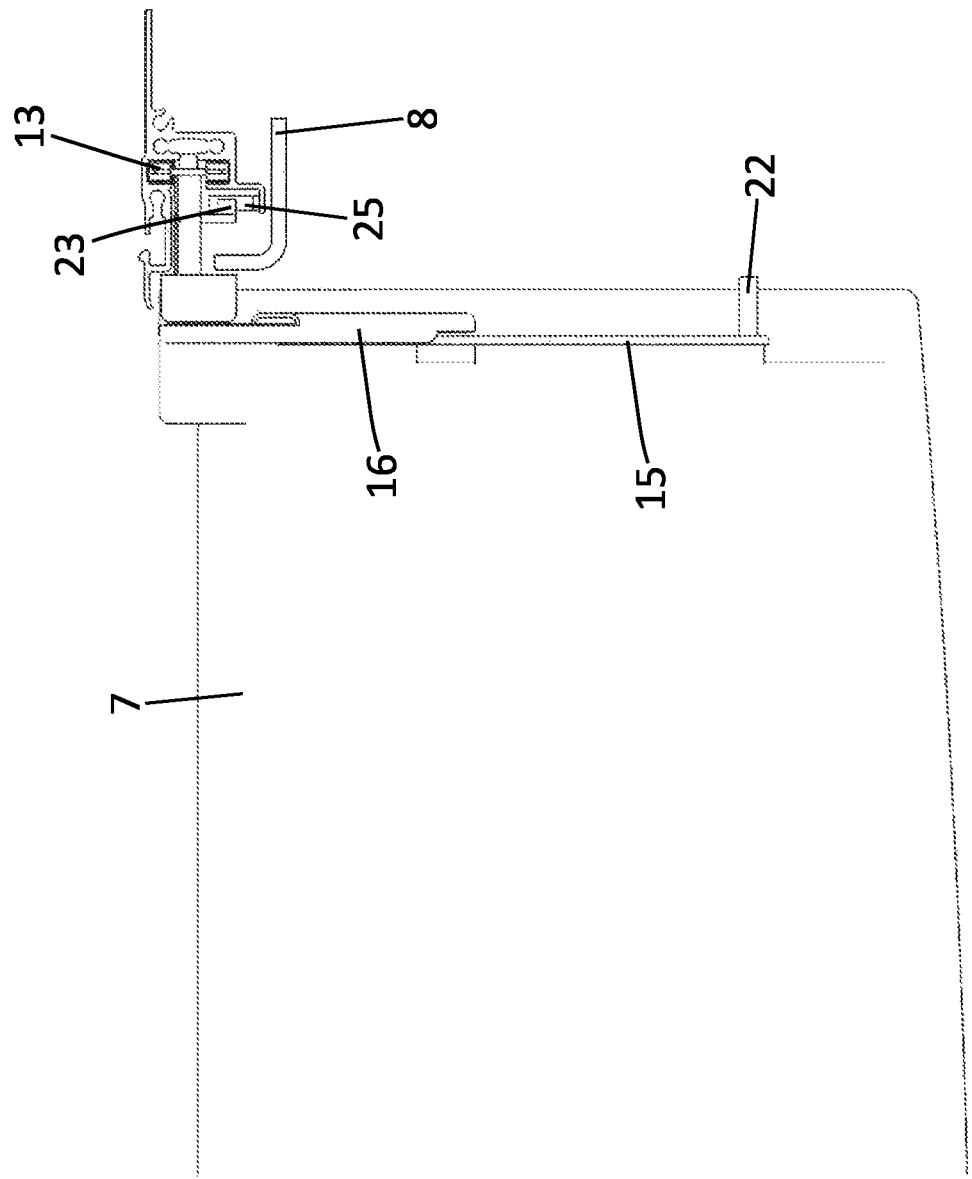
Figure 17:
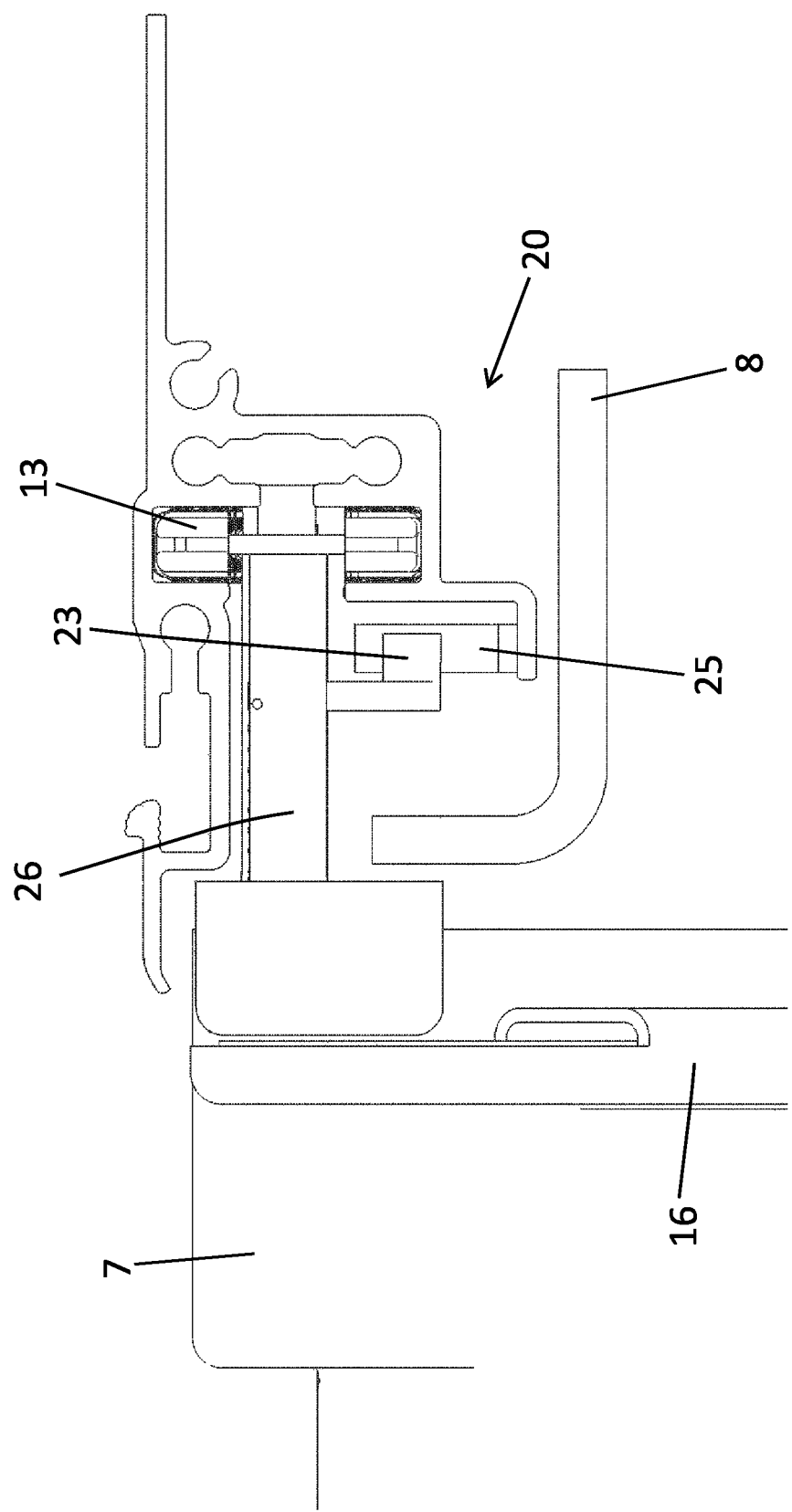

FIGS. 16 to 18 show the display screen arrangement 7 and locking unit 20 viewed along the guide rail 8 or longitudinal axis L. FIGS. 16 to 18 thus show a respective cross-section in the y-z plane perpendicular to the x-axis or longitudinal axis L (see FIG. 1). FIGS. 16 and 17 show the open-pivoted display screen arrangement 7, wherein the locking hook 21 is in its open position. FIG. 18 shows the closed-pivoted display screen 7, wherein the locking hook 21 is in its closed position securing the display screen arrangement 7.

FIG. 19 shows a further exemplary embodiment of the device 10 in which the locking hook 21 is not arranged inside the frame-like spacer 26, but is coupled by means of a pivot lever 29 and a coupling lever 27 to the spacer 26 and the guide element 23. The coupling lever 27 has an opening in the form of a slot 28, in which a coupling pin 17 arranged on the pivot lever 16 of the lever arrangement engages. By means of the coupling pin 17 and slot 28, a guided movement of the locking hook 21 can be executed so that by pivoting of the cooperating lever and control arm, the locking pin 22 is guided towards the locking hook 21 and is reliably and securely held thereby in the closed position.

LIST OF REFERENCE SIGNS

1 Motor vehicle
2 Vehicle roof
3 Roof frame
5 Cover
7 Display screen arrangement
8 Guide rail
10 Device
11 Main slider
12 Drive cable of main slider
13 Adjustment slider
14 Drive cable of adjustment slider
15 Main control arm
16 Pivot lever
17 Coupling pin
20 Locking unit
21 Locking hook/locking element
22 Locking pin
23 Guide element
24 Spring element
25 Stop element
26 Frame-like spacer
27 Coupling lever
28 Slot
29 Pivot lever
L Longitudinal axis/direction of travel

The invention claimed is:

1. Device for securing a display screen arrangement for a vehicle roof, comprising:
   a main slider and an adjustment slider which can each be coupled to the display screen arrangement and are configured for pivoting the display screen arrangement open and closed and for moving it,
   a lever arrangement which is coupled to the main slider and to the adjustment slider for open-and closed-pivoting and movement of the display screen arrangement, and
   a locking unit comprising a locking element which is coupled to the adjustment slider so as to be pivotable relative to the adjustment slider, and which cooperates with a locking pin arranged on the lever arrangement so that an open position of the locking element, in which the locking element is spaced from the locking pin, and a closed position of the locking element, in which the locking element retains the locking pin, can be set, and the display screen arrangement can be transferred from a first open-pivoted state into a second closed-pivoted state.

2. Device according to claim 1, wherein the locking unit comprises a guide element which is coupled to the locking element and configured to cause a pivot movement of the locking element in order to form the closed position of the locking element.

3. Device according to claim 2, wherein the locking unit comprises a stop element which cooperates with the guide element so that, in the open position of the locking element, the guide element is spaced from the stop element, and contacts the stop element when the closed position of the locking element is formed.

4. Device according to claim 2, wherein the guide element cooperates with a sliding block guide which predefines a guided movement of the guide element for setting the open position and the closed position of the locking element.

5. Device according to claim 1, wherein the locking unit comprises a spring element which is coupled to the locking element and configured to exert a spring force on the locking element that drives the locking element into the open position.

6. Device according to claim 1, wherein the locking element is formed as a hook.

7. Device according to claim 1, wherein the locking unit comprises a pivot lever on which the locking element is formed and which has a slot, wherein a coupling pin is arranged on a pivot lever of the lever arrangement and engages in the slot, so as to set a movement of the locking element and of the locking pin relative to each other which is guided by the coupling pin and the slot.

8. Device according to claim 1, wherein the lever arrangement comprises a main control arm and a pivot lever which are coupled together so as to be pivotable relative to each other, wherein the main control arm is provided for coupling to the display screen arrangement, and the pivot lever couples the main control arm to the adjustment slider, and wherein the locking pin is formed on an end of the main control arm which faces away from the adjustment slider with respect to a first open-pivoted state of the display screen arrangement.

9. Device according to claim 1, comprising: a first drive unit which is coupled to the main slider by a first drive cable, and a second drive unit which is coupled to the adjustment slider by a second drive cable, wherein the first and/or the second drive unit comprises an electric motor.

10. Vehicle roof for a motor vehicle, comprising: guide rails which are arranged on opposite sides of the vehicle roof with respect to a longitudinal axis (L) of the vehicle roof, and a device for securing a display screen arrangement according to claim 1, which is coupled to the vehicle roof by the guide rails.

11. Device for securing a display screen arrangement for a vehicle roof, comprising: a main slider and an adjustment slider which can each be coupled to the display screen arrangement and are configured for pivoting the display screen arrangement open and closed and for moving it, a lever arrangement which is coupled to the main slider and to the adjustment slider for open-and closed-pivoting and movement of the display screen arrangement, and a locking unit comprising a locking element which is coupled to the adjustment slider so as to be pivotable relative to the adjustment slider, and which cooperates with a locking pin arranged on the lever arrangement so that an open position of the locking element, in which the locking element is spaced from the locking pin, and a closed position of the locking element, in which the locking element retains the locking pin, can be set, and the display screen arrangement can be transferred from a first open-pivoted state into a second closed-pivoted state, wherein the locking unit comprises a frame-like spacer which is coupled on one side to a pivot lever of the lever arrangement and on the other side to the adjustment slider, and inside which the locking element is arranged.

12. Method for securing a display screen arrangement for a vehicle roof, comprising: driving a main slider and/or an adjustment slider, which are pivotably coupled to the display screen arrangement a lever arrangement, and thereby pivoting the display screen arrangement to transfer the display screen arrangement from a first open-pivoted state into a second closed-pivoted state, and locking the display screen arrangement in the second retracted state by pivoting of a locking element, which is coupled to the adjustment slider so as to be pivotable relative to the adjustment slider and which cooperates with a locking pin arranged on the lever arrangement, so that an open position of the locking element in which the locking element is spaced from the locking pin, and a closed position of the locking element in which the locking element retains the locking pin, can be set, thereby forming a secure second state of the display screen arrangement.

* * * * *